Feb. 6, 1951 M. KAPLOWITZ 2,540,738
FRICTION DRIVE
Filed April 23, 1948 2 Sheets-Sheet 1
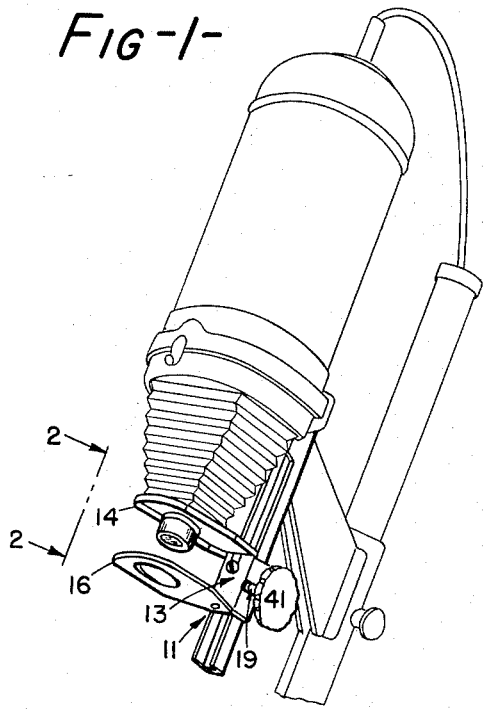
INVENTOR:
Morris Kaplowitz
BY
his Agent

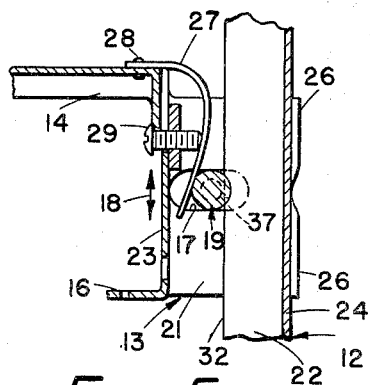
FIG-5-
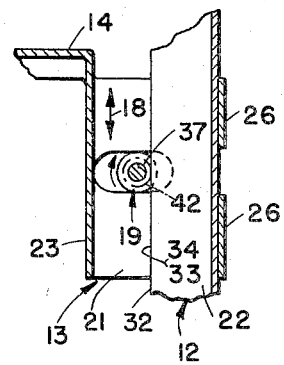
FIG-7-
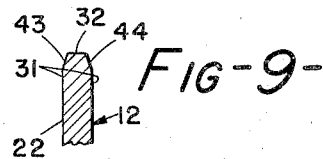
FIG-9-
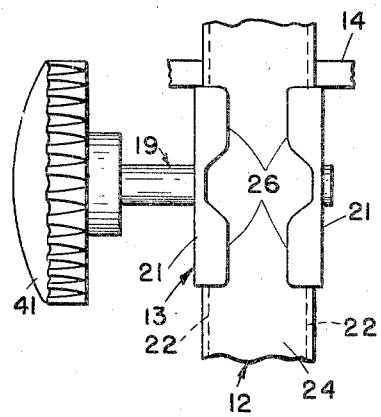
FIG-8-
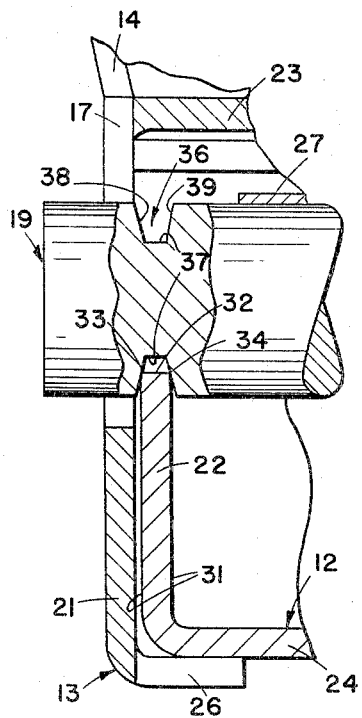
FIG-6-

Patented Feb. 6, 1951

2,540,738

UNITED STATES PATENT OFFICE 2,540,738

FRICTION DRIVE

Morris Kaplowitz, Brooklyn, N. Y., assignor to Federal Manufacturing & Engineering Corp., a corporation of New York Application April 23, 1948, Serial No. 22,805

6 Claims. (Cl. 74—206)

1

The invention relates to friction drives and relates more particularly to friction drives wherein one element slides relative to another and is moved by a frictional roller member.

The friction drive may be described in connection with the focusing device of a photographic enlarger, but it will be well understood that the use of the invention is not restricted thereto. Also, for the purpose of comprehension and clarity, one element may be considered to be secured to the lamp housing which is a stationary part of the enlarger, and the other element to the lens barrel thereof and to be movable relative to the first, stationary, element for the purpose of focusing.

One of the principal objects of the invention is the provision of a friction drive that will normally operate slip-free but will admit of slipping if the sliding movement is blocked by an external force of predetermined magnitude, to prevent damage to the drive and to the parts attached thereto.

Another object of the invention is to provide rotatable means for strongly engaging frictionally a surface to roll thereon for sliding two elements with relation to each other.

A further object of the invention is to provide such a friction drive having parts which are easy to manufacture and simple to assemble and do not require but the simplest maintenance.

A still further object of the invention is the provision of adjustable resilient means in such a friction drive for varying the degree of rolling friction between the rotatable member and the surface of one element.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel construction, arrangement and combination of various devices, elements and parts, as set forth in the claims hereof, certain embodiments of the same being illustrated in the accompanying drawings and described in the specification.

For a fuller understanding of the nature and objects of the invention, reference should be had to the following detailed description, taken in connection with the accompanying drawings, wherein:

Fig. 1 is a perspective fragmentary view of a photographic enlarger embodying a friction drive for focusing, in accordance with the invention;

Fig. 2 is an elevational fragmentary view of the friction drive shown in Fig. 1, as seen in direction 2—2 of Fig. 1, substantially all the enlarger elements having been omitted;

Fig. 3 is a fragmentary side elevational view of the device shown in Fig. 2 as seen in the direction 3—3 of Fig. 2;

Fig. 4 is a sectional fragmentary view, taken along line 4—4 of Fig. 2;

Fig. 5 is a fragmentary sectional view taken along line 5—5 of Fig. 4;

Fig. 6 is a fragmentary sectional view, similar to Fig. 4, showing only a portion thereof but on an enlarged scale;

Fig. 7 is a fragmentary sectional view taken along line 7—7 of Fig. 4;

Fig. 8 is a fragmentary elevational rear view, as seen in direction 8—8 of Fig. 3; and Fig. 9 is a sectional view showing a fragmentary modified element of Fig. 6.

In carrying the invention into effect in one of the embodiments which has been selected for illustration in the accompanying drawings and for description in this specification, and referring now particularly to Fig. 1, a friction drive generally indicated at 11 is provided, shown for use in connection with a photographic enlarger. The drive comprises a stationary element 12, for instance a channel-shaped longitudinal focusing mount post, or channel, that is secured with relation to the enlarger lamp house and extends downwardly therefrom. A movable element 13, for instance a focusing mount, slidably engages the stationary element 12 for movement in opposite, upward and downward, directions. A lens board 14 and a filter holder 16 are secured to the movable element 13 and movable therewith for focusing the enlarger image by changing the vertical position of the lens board, and therewith the lens relative to the stationary element 12 and thus relative to the negative that is held in the enlarger lamp house.

As best shown in Figs. 3, 5, and 7, the movable element 13 is provided with two opposite slots 17 that are aligned in a direction transverse to the direction of movement 18 of the movable element 13 relative to the stationary element 12. A rotatable shaft, that is generally indicated at 19, is disposed in said slots 17 and extends through and projects laterally beyond the confines of the movable element 13 on both sides thereof.

The shaft 19 is arranged to roll, upon being rotated, relative to the stationary element 12, as will be explained herein below. Since the slots 17 are adjacent the circumference of the shaft 19 on at least two opposite points, a rolling movement of the shaft 19 relative to the stationary element 12 will be transformed into a sliding movement of the movable element 13, with the circumference of the shaft 19 engaging the slots 17 to propel the movable element relative to the stationary.

In the foregoing, the longitudinal element 12 has been assumed to be stationary and the other element 13 to be movable relative thereto. This assumption has been made for the purpose of clarity and simplicity in explaining the invention in connection with the photographic enlarger. It will be understood, however, that these are only relative terms and that one element is slidably movable relative to the other element, and that the distribution among the elements of which is to be stationary and which movable is not necessarily confined to the terms assigned hereinabove, and is not intended to be limited thereto.

The movable element 13, as best shown in Fig. 4, may be U-shaped, comprising two arm portions 21, that extend alongside the members or legs 22 of the channel element 12, and which are interconnected by a connecting piece 23 that is diametrically oppositely disposed relative to the web 24 of the channel 12. The ends 26 of the arm portions 21 of the movable element 13 are bent inwardly at about right angle to slide against the edge portion of the exterior of the web 24.

The slots 17 are located in the sidewalls or arm portions 21 and have an elongated shape to permit friction pressure adjustment, as will be explained presently. A leaf spring 27 is mounted with relation to the movable element 13 at 28, and is bent at about right angle, for tensioning, and extends to the surface of the shaft 19, for pressing the latter towards the stationary element 12. An adjustment device, for instance a screw 29, is secured to the connecting piece 23 and extends to the interior of the movable element 13 and there engages the spring 27. Turning of the screw 29 will increase or decrease the pressure of the spring exerted against the shaft 19, depending upon the direction of turning of the screw.

The stationary element 12 has been assumed to be channel-shaped for the purpose of explaining the working of the invention. It is understood, however, that it may have different shapes, for instance a single leg instead of two, or be otherwise modified, without departing from the spirit and scope of the invention save as limited by the appended claims.

The working of the friction drive is best shown in Figs. 4, 6, and 7. The legs 22 of the channel 12 are spaced for a certain distance; each leg 22 has a rectangular shape with substantially parallel side wall surfaces 31, and terminates in a terminal surface 32 that intersects with the wall surfaces 31 at an outer edge 33 and an inner edge 34, respectively.

The shaft 19 is provided with two annular grooves 36 that are spaced from each other for substantially the same certain distance as the two legs 22 of the channel 12. Each groove has a conical cross section and is flaring outwardly in the direction from the center towards the circumference of the shaft. The grooves 36 are parallel and each groove 36 is arranged concentric with the cylindrical body of the shaft 19. Each groove provides an annular recess in the surface of the shaft and is provided with a cylindrical inner surface 37 that is substantially concentric with the circumference of the shaft 19 and two tapered surfaces 38 and 39 that adjoin said cylindrical surface 37, each of said surfaces 38 and 39 being at a preferred angle of about 102¼° to the cylindrical surface 37, whereby said surfaces 38 and 39 form an acute angle of 24½° with each other.

The cylindrical surface 37 has a width that is smaller than the width of said terminal surface 32 of the channel 12; but the width of the groove 36, where it intersects with the circumference of the shaft 19, is greater than the width of the said terminal surface 32. After the device is assembled, the shaft 19 rests against the channel 12, with the terminal surfaces 32 of the channel protruding into the grooves 36, and the edges 33 and 34 abutting against the tapered surfaces 38 and 39, respectively. By this positioning of the terminal surfaces 32 within the grooves 36 of the shaft, a frictional engagement is assured between the channel and the shaft, which engagement is maintained, and the engagement pressure of which may be varied, by the spring 27.

As best shown in Figs. 6 and 7, the terminal surface 32 normally is spaced from the cylindrical surface 37, and substantially the only contact intermediate the channel 12 and the shaft 19 is provided by the edges 33 and 34 on one hand and the tapered surfaces or walls 38 and 39 on the other.

The edges 33 and 34 may, however, be de-burred or the channel legs be slightly tapered near the terminal surface 32 prior to the assembly of the drive; this modification is illustrated in Fig. 9, where the tapered portions 43 and 44 are provided on the legs of the channel (only one leg being shown), to engage frictionally the tapered surfaces 38 and 39, respectively, of the shaft grooves 36. The taper between the portions 43 and 44 matches that of the grooves.

A handle 41 is mounted on one end of said shaft 19 to facilitate manual turning of the shaft. Stops (not shown) may be secured to the stationary element 12 to provide abutments for the movable device 13 in either direction for limiting the sliding movement to a portion of the length of the stationary element.

The operation of the friction drive is as follows: the shaft 19 may be rotated manually by applying rotational force to the handle 41. Thereupon, the shaft 19 will roll against the channel 12, with the rolling taking place along a circle 42 (shown in dot-and-dash lines in Fig. 7) that is disposed intermediate the inner surface 37 and the circumference of the shaft 19 and substantially concentric therewith. The two surfaces 38 and 39 are disposed at an acute angle opposite each other and are wedged against the terminal edges 33 and 34 of the channel, by means of the power exercised by the spring 27, and thereby the rolling of the shaft relative to the channel will normally be slip free due to the great amount of friction between these edges and the surfaces.

This rolling motion is transmitted to the movable element 13 by means of the two slots 17 that are provided in the side walls 21 of the movable element and through which the shaft 19 projects. The cylindrical portions of the shaft that adjoin the edges of the slots 17 will bear against the latter when the shaft is rotated and cause the movable element 13 to slide relative to the stationary element 12. This relative movement may take place in either of two opposite sliding directions 18, depending upon the rotation imparted to the shaft.

By turning the screw 29, the pressure exerted by the spring 27 against the surface of the shaft 19 may be varied.

When the friction drive is new, the legs 22 of the channel element 12 will protrude to about midway of the depth of the groove 36. Long use of the drive may dull the sharpness of the edges 33 and 34 and thus may cause, under the influence of the spring 27, the terminal surface 32 to be brought closer to the inner surface 37. This change in position does not affect the accurate functioning of the drive, but insures continued good working over long periods of time. Or, as shown in Fig. 9, the edges may be deburred and the legs be provided with tapered portions 43 and 44 before assembly to insure good friction between the contact surfaces.

The invention is not limited to the engagement of all four edges 33 and 34 with all four groove walls or surfaces 38 and 39; the invention includes the engagement between any one or two or more edges 33 or 34 and any one or two or more groove surfaces 38 or 39, respectively in contact therewith, as long as the friction contact therebetween is maintained.

Certain of the advantages of the invention have already been herein referred to. It may be useful, however, to allude particularly at this point to the simplicity of the drive that obviates the use of costly gears and racks that have heretofore been often used for such purpose; furthermore, to the safety provided by slipping of the normally slip-free drive in the event that the relative movement between the elements should be blocked by an outside force. This arrangement, in the event of blocking, effectively prevents damage to the friction drive parts and the parts connected thereto, such as the enlarger lens, thereby rendering the drive proof against carelessness in use.

Moreover, the use of a straight channel obviates complicated machining operation and merely provides for a simple stamping operation. Even where the channel has tapered portions (Fig. 9) or is otherwise de-burred, the necessary operation is simple and speedy. The grooved shaft may be made on an automatic screw machine which obviates operations involving great precision.

A further advantage of this drive may be found in the elimination of back-lash such as almost always occurs in geared drives. Finally, the fact that the rolling takes place along a circle (42) that is within the circumference of the shaft provides for a small transmission ratio and therefore permits fine adjustment of the position of one element of the drive relative to the other.

Since certain changes may be made in the above article and different embodiments of the invention could be made without departing from the scope thereof, it is intended that all matter contained in the above description or shown in the accompanying drawings shall be interpreted as illustrative and not in a limiting sense.

Having thus described the invention, what I claim as new and desire to be secured by Letters Patent, is as follows:

1. In a friction drive, for use in connection with two elements slidably movable relative to each other for a distance, means for effecting such movement comprising, in combination, two substantially parallel members associated with one of said elements and spaced for a certain distance from each other throughout the extent of said first mentioned distance, each member having a width of substantially constant size throughout said first distance, a rotatable shaft adjacent said members and having two outwardly flaring conical annular grooves spaced for substantially the same said certain distance, each groove arranged to receive a member and having two opposite walls forming a wedge to engage said member in said wedge frictionally in rolling contact, the width of each member being smaller than the greatest width of said groove and larger than the smallest width of the groove with which the edge is in engagement, said second element including means for restricting movement relative to said first element to sliding and including opposite portions adjacent said shaft adapted to be in abutment therewith for movement thereby in opposite directions within said first mentioned distance, and means intermediate said second element and said shaft for resiliently pressing said grooves into engagement with said parallel members of said first element.

2. In a friction drive, for use in connection with two elements adapted to slide relative to each other, means for actuating sliding movement therebetween comprising, in combination, a surface having an edge associated with one of said elements, a rotatable member adjacent said surface and having a portion adapted to engage said edge frictionally for rolling said member relative to said surface, means associated with said second element for connecting the same to said first element and adapted to restrict movement therebetween to sliding, abutment portions connected to said second element and adapted to be positioned adjacent the exterior of said member to be moved thereby in opposite directions, resilient means intermediate said member and said second element for pressing said member towards said surface, and adjusting means connected to said second element and operable to vary the pressure of said resilient means.

3. In a friction drive, for use in connection with two elements adapted to slide relative to each other, means for actuating sliding movement therebetween comprising, in combination, a surface having an edge associated with one of said elements, a rotatable shaft adjacent said surface and having a portion adapted to engage said edge frictionally for rolling said shaft relative to said surface, means associated with said second element for connecting the same to said first element and adapted to restrict movement therebetween to sliding, abutment portions connected to said second element and adapted to be positioned adjacent said shaft to be moved thereby in opposite directions, a spring secured to said second element and extending to the exterior of said shaft and independent of the rotational movement of said shaft, said spring tensioned to exert normally pressure of a predetermined magnitude onto said shaft for pressing the same towards said first element irrespective of rotation of said shaft, and a screw mounted on said second element and extending to said spring adjacent said shaft and operably to vary the magnitude of pressure of said spring for altering the degree of frictional engagement intermediate said shaft portion and said edge.

4. In a friction drive, for use in connection with two elements adapted to slide relative to each other for instance for a focusing device of a photographic enlarger, one of said elements including a channel having two parallel straight legs each leg having a straight terminal surface of predetermined width, said second element including clamping means normally in abutment with the web of said channel on the exterior thereof for restricting movement between said elements to a rectilinear sliding movement in opposite directions, a rotatable member disposed adjacent said edges and in abutment contact with said second element, said rotatable member having two grooves including walls, said grooves spaced for substantially the same said distance extending between said terminal surfaces, each terminal surface extending to the interior of a groove and having an edge in frictional contact with a wall thereof, whereby said rotatable member may roll relative to said terminal surfaces when it is being rotated, power means connected to said second element and operable for forcing the rotatable member towards said channel, and adjusting means for said power means adapted to vary the force exerted by said power means towards said rotatable member.

5. In a friction drive, for use in connection with two elements slidably movable relative to each other for a distance, means for effecting such movement comprising, in combination, two substantially parallel members associated with one of said elements and spaced for a certain distance from each other throughout the extent of said first mentioned distance, each member including a surface having a width of substantially constant size throughout said first distance, said members flaring outwardly from said surface to increase the thickness in accordance with a predetermined taper, a rotatable shaft adjacent said members and having two outwardly flaring conical annular grooves spaced for substantially the same said certain distance, each groove flaring substantially in accordance with said first named taper, arranged to receive a member and having two opposite walls forming a wedge to engage said member in said wedge frictionally in rolling contact, the width of each member being smaller than the greatest width of said groove and larger than the smallest width of the groove with which the edge is in engagement, said second element including means for restricting movement relative to said first element to sliding and including opposite portions adjacent said shaft adapted to be in abutment therewith for movement thereby in opposite directions within said first mentioned distance, and means intermediate said second element and said shaft for resiliently pressing said grooves into engagement with said parallel members of said first element, whereby the positioning of said members relative to said grooves is adjustably variable.

6. In a friction drive, for use in connection with two elements adapted to slide relative to each other for instance for a focusing device of a photographic enlarger, one of said elements including a channel having two parallel legs each leg having a straight terminal surface of predetermined width, and having a thickness tapering towards said terminal surface at a predetermined angle of convergence, said second element including clamping means normally in abutment with the web of said channel on the exterior thereof for restricting movement between said elements to a rectilinear sliding movement in opposite directions, a rotatable member disposed adjacent said edges and in abutment contact with said second element, said rotatable member having two grooves including walls, said grooves spaced for substantially the same said distance extending between said terminal surfaces, each groove being tapered towards the shaft axis at an angle substantially alike the first named angle, each terminal surface extending to the interior of a groove and having an edge in frictional contact with a wall thereof, whereby said rotatable member may roll relative to said terminal surfaces when it is being rotated, power means connected to said second element and operable for forcing the rotatable member towards said channel, and adjusting means for said power means adapted to vary the force exerted by said power means towards said rotatable member.

MORRIS KAPLOWITZ.

REFERENCES CITED

The following references are of record in the file of this patent:

UNITED STATES PATENTS

| Number | Name | Date |
|---|---|---|
| 2,119,710 | Holder | June 7, 1938 |
| 2,329,635 | McGall | Sept. 14, 1943 |